(12) United States Patent
Block et al.

(10) Patent No.: US 12,228,108 B2
(45) Date of Patent: Feb. 18, 2025

(54) ENERGY PRODUCTION LOSS DUE TO HIGH WIND HYSTERESIS CONTROL

(71) Applicant: VESTAS WIND SYSTEMS A/S, Aarhus (DK)

(72) Inventors: Jens Kusk Block, Risskov (DK); Asier Berra, Billund (DK)

( * ) Notice: Subject to any disclaimer, the term of this patent is extended or adjusted under 35 U.S.C. 154(b) by 143 days.

(21) Appl. No.: 18/009,921

(22) PCT Filed: Jun. 3, 2021

(86) PCT No.: PCT/DK2021/050174
§ 371 (c)(1),
(2) Date: Dec. 12, 2022

(87) PCT Pub. No.: WO2021/249602
PCT Pub. Date: Dec. 16, 2021

(65) Prior Publication Data
US 2023/0220831 A1   Jul. 13, 2023

(30) Foreign Application Priority Data
Jun. 10, 2020   (DK) .......................... PA 2020 70367

(51) Int. Cl.
*F03D 7/00*   (2006.01)
*F03D 7/02*   (2006.01)
*F03D 17/00*   (2016.01)

(52) U.S. Cl.
CPC ............. *F03D 7/028* (2013.01); *F03D 17/00* (2016.05); *F05B 2260/821* (2013.01); *F05B 2260/84* (2013.01); *F05B 2270/3201* (2013.01)

(58) Field of Classification Search
CPC .... F03D 7/028; F03D 17/00; F05B 2260/821; F05B 2260/84; F05B 2270/3201; Y02E 10/72
See application file for complete search history.

(56) References Cited

U.S. PATENT DOCUMENTS

2010/0237617 A1* 9/2010 Vyas .................. G06Q 50/06
290/44

FOREIGN PATENT DOCUMENTS

CN   110566404 A   12/2019
EP   3540214 A1    9/2019

OTHER PUBLICATIONS

International Search Report and Written Opinion for PCT Application No. PCT/DK2021/050174, dated Sep. 1, 2021.
(Continued)

*Primary Examiner* — Julio C. Gonzalez
(74) *Attorney, Agent, or Firm* — Patterson + Sheridan, LLP; Gero G. McClellan

(57) ABSTRACT

Aspects of the present invention relate to a computer-implemented method for predicting energy production losses associated with high wind hysteresis control of a wind turbine generator. The method comprises: determining a distribution of wind speeds; determining a high wind hysteresis band that comprises wind speed values between an upper threshold and a lower threshold; and predicting energy production loss due to the high wind hysteresis control. The prediction includes: determining a high wind factor corresponding to a probability that the wind speeds in the hysteresis band occur when the generator is shut off by the high wind hysteresis control, determining, based on the distribution and power data, an energy value associated with the wind speeds falling within the hysteresis band over a predetermined time period; and determining the energy production loss by applying the high wind factor to the determined energy value.

18 Claims, 6 Drawing Sheets

(56) References Cited

OTHER PUBLICATIONS

Horvath, L. et al., "The influence of high wind hysteresis effect on wind turbine power production at Bura-dominated site", http://www.proceedings.com/, Jan. 1, 2007 (Jan. 1, 2007), XP055834459.

Rycroft Mike, "Enabling wind turbines to operate at high wind speeds—EE Publishers", Apr. 10, 2015 (Apr. 10, 2015), XP055833678, Retrieved from the Internet: URL:https://www.ee.co.za/article/enabling-wind-turbines-operate-high-wind-speeds.htm, [retrieved on Aug. 20, 2021].

Moreno, P., "Wind Time Series—Don't panic, it's just Hysteresis—Vortex", Nov. 5, 2019 (Nov. 5, 2019), XP055833679, Retrived from the Internet: URL:https://vortexfdc.com/dont-panic-its-just-hysteresis/ [retrieved on Aug. 20, 2021].

Danish Patent Office, Search Report for Danish Patent Application No. PA 2020 70367, dated Nov. 19, 2020.

Han et al., "Preventive Response Strategy for Wind Integrated Power System under High Wind Events", 2019 IEEE Power & Energy Society General Meeting (PESGM), published Aug. 4, 2019.

\* cited by examiner

ENERGY PRODUCTION LOSS DUE TO HIGH WIND HYSTERESIS CONTROL

TECHNICAL FIELD

The present disclosure relates to methods for determining energy production losses due to high wind hysteresis control strategies for wind turbine generators, and to a method of determining annual energy production.

BACKGROUND

Understanding the energy production of a proposed or existing wind farm, comprising a plurality of wind turbine generators, is important in ensuring that the wind farm is as efficient as possible, as well as providing assurances that energy requirements will be met by the wind farm. In order to determine energy production of a wind farm, it is important to understand how the operation of the generators affects power generation and where losses and gains are introduced by that operation.

In particular, consideration needs to be given to the effect of control strategies for high wind speed situations. Wind turbine generators operate to implement what is called 'high wind hysteresis', which is embodied by a difference in threshold wind speeds at which a generator's operation is paused and resumed in the presence of high wind speeds. If a single speed is use for shut-off and restart of the generator, the generator may experience accelerated wear of important components, such as the rotor bearings, blade pitch bearings, and braking apparatus. This is because the generator is operated to repeatedly pause and resume operation as the wind oscillates around a particular speed. Introducing hysteresis control, in which the different hysteresis thresholds for shut-off and restart conditions are applied, reduces this wear.

It is theoretically possible to model a generator's energy production losses due to high wind hysteresis if a time series sampled at high frequency is provided of wind speeds at the site measured over a long period of time, i.e. a year. High frequency may be in the order of a few Hz or higher. However, the computational power and storage required to perform this modelling is extremely high and so isn't practical. Moreover, time series for wind speeds are rarely available.

In light of this, some attempts have been made to provide rough approximations to the losses caused by high wind hysteresis based on wind speed distributions, based on average wind speeds obtained for a predetermined time period, such as 10 minutes. However, it is common for these approximations to be rooted in assumptions, rather than operational data, perhaps because access to data for validation purposes has been limited. An example of an existing model is the model suggested in Part 6 of the "Technical Guidelines for Wind Energy" produced by the Fördergesellschaft Windenergie und andere Dezentrale Energien (FGW e.V). While this model is useful, it relies on an oversimplification of wind speeds and their interaction around the hysteresis thresholds.

It is an aim of the present invention to provide a method for predicting energy production losses that are accurate and that do not have high computational power demands when compared with the prior art.

SUMMARY OF THE INVENTION

According to an aspect of the present invention there is provided a computer-implemented method for predicting energy production losses associated with high wind hysteresis control of a wind turbine generator. High wind hysteresis control, as used herein, comprises shutting off the wind turbine generator when a wind speed exceeds an upper hysteresis threshold value. The wind turbine generator is shut off until the wind speed reaches a lower hysteresis threshold value. When the wind speed reaches the lower hysteresis threshold value, the operation of the generator is restarted. The method comprises the steps of: determining a distribution of wind speeds for a site of the wind turbine generator; determining a high wind hysteresis band for the wind turbine generator that comprises a range of wind speed values between the upper hysteresis threshold value and the lower hysteresis threshold value; and predicting energy production loss due to the high wind hysteresis control. The step of predicting energy production loss includes: determining a high wind factor corresponding to a probability that the wind speeds in the hysteresis band occur during a period when the wind turbine generator is shut off by the high wind hysteresis control; determining, based on the distribution of wind speeds and power data associated with the wind turbine generator, an energy value associated with the wind speeds falling within the hysteresis band over a predetermined time period; and determining the energy production loss by applying the high wind factor to the determined energy value.

Within the above method, the wind speeds of the distribution may be average wind speeds, typically 10-minute average wind speeds. The wind speeds referred to in relation to the probability may be moving average wind speeds, typically exponential moving average wind speeds.

The determined energy value is the energy value of all wind speeds within the distribution that are within the hysteresis band. The energy value is considered to include two potential energy components: potential energy that can be generated from wind speeds that occur when the wind turbine generator is not shut off and potential energy that cannot be generated from wind speeds that occur when the wind turbine generator is shut off. The application of the probability to the energy value enables the splitting off of the 'lost' energy when the generator is shut off.

Advantageously, the use of the method described above improves upon existing methods and yields accurate results. This is due to the use of the available data, i.e. distributions of wind speeds, to generate a model that accounts for both the weight of the wind speeds falling within the hysteresis band and their shape, thus resulting in the energy value and the probability value. This is in contrast to existing methodologies that rely only on the weight of the wind speeds, and thus estimate more inaccurately.

The power data associated with the wind turbine generator may be derived from a wind speed-power profile for the wind turbine generator. Alternatively, the power data associated with the wind turbine generator may comprise a rated power of the wind turbine generator.

The distribution of wind speeds may comprise a wind speed-frequency distribution. The wind speed-frequency distribution may be a distribution for the site. The distribution may be determined by measurements of wind speed made by one or more meteorological masts or by measurements from the turbine. The wind speeds may be free-stream wind speeds or approximations to the free-stream wind speed. Approximations to the free-stream wind speed may be determined based on measurements from nacelle-mounted wind sensors. The measurements may be converted to an approximation to free-stream wind speeds using a nacelle transfer function.

Determining the energy value may comprise determining an integral of a function of the distribution of wind speeds between the bounds of the hysteresis band. Alternatively, determining the energy value may comprise determining an approximation to the integral of a function of the distribution of wind speeds between the bounds of the hysteresis band.

The energy value may be determined using the formula:

$$T \int_{v_{re}}^{v_{cut}} P(v) f(v) dv$$

where T is the predetermined period of time over which the loss is to be calculated, $v_{cut}$ is the upper hysteresis threshold wind speed value, $v_{re}$ is the lower hysteresis threshold wind speed value, P(v) is the power at wind speed v, and f(v) is the frequency of the wind speed v in a frequency distribution.

The high wind factor may indicate the probability that a wind speed enters the hysteresis band from above, by crossing the upper threshold value from a value above the upper threshold value. The high wind factor may be determined based on the distribution of wind speeds. Determining the high wind factor may comprise determining a ratio corresponding to the number of wind speeds entering the hysteresis band from above to the total number of wind speeds entering the hysteresis band from above and below. Applying the high wind factor to the determined energy value may comprise multiplying the energy value by the ratio.

The high wind factor may be determined using the formula:

$$\frac{f(v_{cut})}{f(v_{cut}) + f(v_{re})}$$

wherein $f(v_{cut})$ and $f(v_{re})$ are the frequencies of the upper hysteresis threshold and lower hysteresis threshold wind speed values respectively in a frequency distribution of wind speeds.

Optionally, the method comprises the steps of: performing the steps of the method for predicting the energy production loss for a plurality of different hysteresis bands; and selecting one of the plurality of hysteresis bands for implementing high wind hysteresis control at the wind turbine generator. The method may comprise determining operational forces and wear associated with each of the plurality of different hysteresis bands. The selection of one of the plurality of hysteresis bands may be performed on the basis of an analysis comparing the energy production losses and operational forces and wear associated with each hysteresis band.

Alternatively, or additionally, the method may comprise determining annual energy production of the generator, the annual energy production comprising the predicted energy production loss.

Predicting energy production loss due to the high wind hysteresis control may comprise determining an energy gain value associated with the high wind hysteresis control, and determining the energy production loss by applying the energy gain value and the high wind factor to the energy production loss.

According to another aspect of the invention, there is provided a system comprising a processor configured to perform the method described above.

According to another aspect of the invention, there is provided a computer-readable storage medium comprising instructions which, when executed by a computer, cause the computer to carry out the steps of the method described above.

According to another aspect of the invention, there is provided a computer-implemented method for predicting power production losses associated with high wind hysteresis control of a wind turbine generator. The method comprises the steps of: determining a distribution of wind speeds for a site of the wind turbine generator; determining a high wind hysteresis band for the wind turbine generator that comprises a range of wind speed values between the upper hysteresis threshold value and the lower hysteresis threshold value; and predicting power production loss due to the high wind hysteresis control. The step of predicting power production loss includes: determining a high wind factor corresponding to a probability that the wind speeds in the hysteresis band occur during a period when the wind turbine generator is shut off by the high wind hysteresis control; determining, based on the distribution of wind speeds and power data associated with the wind turbine generator, a power value associated with the wind speeds falling within the hysteresis band; and determining the power production loss by applying the high wind factor to the determined power value.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
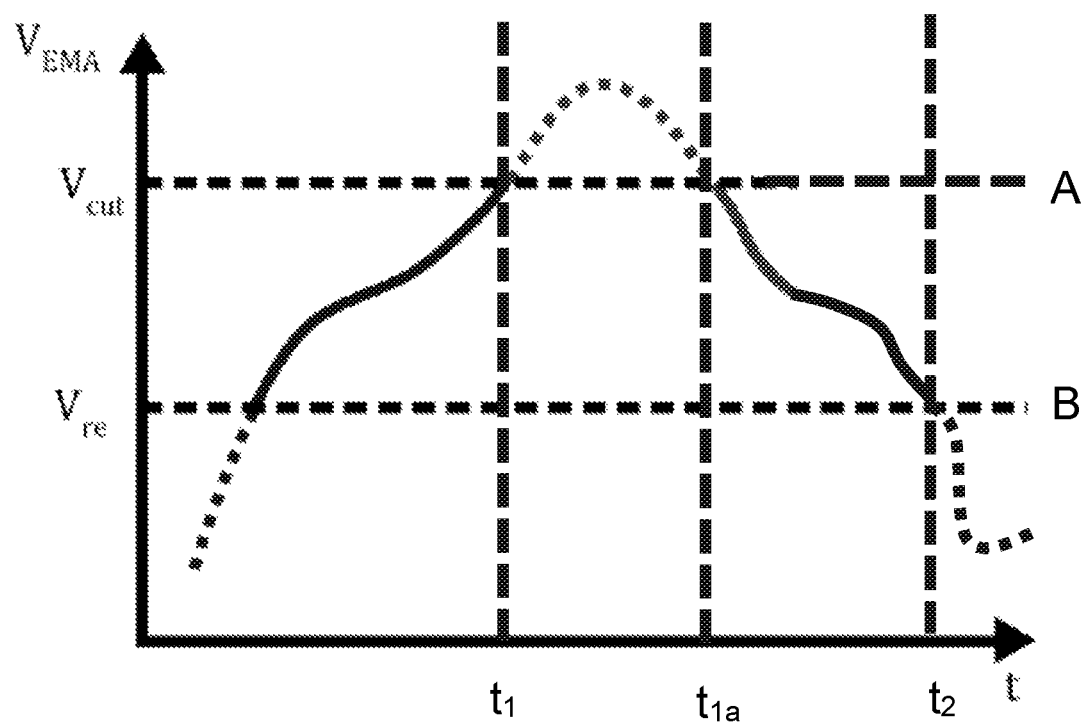
FIG. 1 shows an exemplary wind speed time series.

Generally, the present invention relates to a computer-implemented method of predicting energy production losses due to high wind hysteresis control in wind turbine generators. High wind hysteresis control, as is explained in detail below, is the control of a wind turbine generator according to upper and lower hysteresis thresholds to protect the generator from both high wind speeds and from repetitive cycling between paused and full operation that would unnecessarily stress the generator. As will be well understood, the upper hysteresis threshold corresponds to a speed that, if exceeded, causes shut-off of the generator, which may be referred to as a 'high wind alarm'. The shut-off is maintained until the lower hysteresis threshold is reached. Thus the lower hysteresis threshold corresponds to a speed at which the generator is restarted following a shut-off of the generator, i.e. a high wind alarm. Thus, the upper and lower threshold speeds may be respectively referred to as cut-out and re-cut-in speeds or as shut-off and restart speeds.

The methods described herein relate to a prediction of energy production losses due to the hysteresis control. The prediction is based on wind speed distributions. The distributions are used to identify a total energy value that is potentially lost due to hysteresis thresholds from wind speeds between the hysteresis thresholds. Conversely, this total energy value may be thought of as the potential energy production that may be obtained between the hysteresis thresholds. A factor is also derived, the factor corresponding to a probability of the total energy value/potential energy production between the thresholds being during a period of shut-off of the generator, or in other words during high wind alarm. The factor is used to adjust the total energy value between the thresholds to predict energy losses. The factor may thus be considered to indicate the proportion of energy in the total energy value that corresponds to a loss, with the other part of the total energy value being actually produced. It is shown below, that the system is, in effect, a second order prediction, as both a magnitude of potential losses and a likelihood of those losses being realised is calculated. In doing so, the method provides predicted losses with a greater accuracy than existing approximations that only take the frequency of wind speeds into account in one respect, and therefore have to make assumptions that don't accurately reflect the wind speed control of the turbine.

Definitions of terms used herein are provided below. The term 'site' used in reference to a wind turbine generator includes proposed sites, i.e. those in which generators are planned but whose construction has not yet begun or has not yet been completed, and existing sites, where wind turbine generators are located and operational or able to operate.

As will also be well understood by the skilled person, annual energy production is a well-known term in the field of wind power, wind power plants or farms, and wind turbine generators. Annual energy production (AEP) is the total amount of energy output per year by the farm or a generator, typically measured in kilowatt hours or megawatt hours. Again, while the methods according to the embodiments described and claimed herein are mainly envisaged for use in calculating annual energy production, it will be appreciated that the predicted losses may also be applied to the determination of other parameters used to measure wind farm performance such as the levelized cost of energy (LCOE) and in determining effective power curves, as well as the comparison of different control parameters and strategies and the design of new control parameters and strategies.

In discussing losses and energy production losses, these comprise energy that is not generated by the generator or generators due to the control strategy applied to it, despite the wind speeds being lower than the upper hysteresis threshold wind speed. As will be made clear below, the implementation of a hysteresis control for high wind speeds introduces changes in generated energy production levels because of how the generator reacts to different wind speeds depending upon the recent history of the wind speed. Thus, losses should be considered to be a quantification of the control strategy to be taken into account when considering the production of a generator.

High wind hysteresis control and the surrounding terms will now be described, with reference to the exemplary chart in FIG. 1.

High wind hysteresis control is rooted in the principle that operation of wind turbine generators should be paused above a certain wind speed to prevent high forces that may damage the blades and rotor. In shutting-off the generator when high winds occur, measures can be taken to protect the blades. Therefore, a wind speed is designated as a threshold speed, at and above which the generator is shut-off, known as the cut-off speed. Additionally, a wind speed is designated as a threshold speed at which operation of the generator is resumed, known as the re-cut-in or restart speed.

In shutting off and restarting generator operation, consideration needs to be given to the wear and tear on the generator. Repetitive shutting-off and restarting of the generator would cause excessive wear and stress on particular parts of the generator, so there are several features that balance the wear and tear against energy production.

In particular, the threshold speeds are compared with wind speeds at the generator. The wind speeds that are compared with the thresholds are wind speeds determined using a moving average that is based on wind speeds measured by wind sensors on the turbine at a relatively high frequency. The moving average may be an exponential moving average. As an example, the exponential moving average may have a time constant of 10-minutes (600 seconds) for wind speeds sampled at a frequency of 10 Hz. It will be appreciated that other forms of moving averages, time constants, and sampling frequencies may be used as appropriate. This prevents transient spikes in wind speed from causing shut-downs and restarts, which may lead to sudden changes in operation and therefore stresses on components.

Another feature is having a restart speed that is lower than the cut-out speed, thereby forming a so-called hysteresis band. In other words, upper and lower threshold speeds are defined, corresponding to the cut-out and restart speeds respectively, thereby forming a range of wind speeds from the lower threshold wind speed to the upper threshold wind speed, referred to as the hysteresis band. The hysteresis band reduces the repetitive shut-down/restart cycle by stipulating that wind speeds must be at a lower level than the speed at which the generator was shut off to permit restart. Consequently, this measure reduces stresses on components.

However, as will be appreciated, the hysteresis control introduces scenarios in which losses occur. The use of a moving average, particularly an exponential moving average, means that there may be a delay in restarting a wind turbine generator when compared to wind speeds determined according to an arithmetic average over a time frame, typically 10 minutes, reaching the lower threshold speed. Another loss in production is introduced where the moving averaged wind speed is lower than the upper threshold speed but in which the generator is not producing energy because the lower threshold speed has not been reached.

It will be appreciated that the relative delay introduced by the moving average may also result in a delay in the high wind alarm being triggered, meaning that there is an effective gain of energy for some generators.

Accordingly, high wind hysteresis may be considered to be the effect of the short-term history of the wind speed on the operational state of the generator for protecting the generator at high speeds.

To illustrate this hysteresis, FIG. 1 illustrates an example time series for wind speeds. The wind speeds here are the moving average wind speeds determined at the generator, so only the hysteresis caused by the difference in upper and lower threshold speeds is considered here, and the delay caused by the moving average is disregarded. In FIG. 1, the upper threshold speed is represented by the label $v_{cut}$ and the dashed line A, and the lower threshold speed is represented by the label $v_{re}$ and the dashed line B. The region between is the hysteresis band.

In FIG. 1, where the wind speed moves above the line A and so is higher than the upper threshold speed, a high wind alarm is caused and a generator controller shuts off the generator. An example of this is the section, or 'snippet' of the time series beginning at time $t_1$. At $t_1$ the wind speed rises above the line A and therefore the wind speed is too high and the generator is shut-off. The generator remains shut-off until the wind speed crosses under the line B again, and is below the lower threshold speed $v_{re}$. In FIG. 1, the wind speed crosses under the B line again at time $t_2$, at which point the operation of the generator is resumed because the lower threshold speed has been reached. In the time between times $t_1$ and $t_2$ is a wind speed snippet during which the generator is shut-off. The time that this snippet spends within the hysteresis band, which is between the time $t_{1a}$ and time $t_2$, represents an energy production loss, where the hysteresis control and difference in cut-in and cut-off speeds causes a loss in generation. Time $t_{1a}$ is the time at which the snippet re-crosses the line A, having been above it and therefore having caused a shut-off.

Energy production losses for wind speeds, as will be explained in more detail below, may also be caused when the wind speed dips into the hysteresis band from above by crossing the line A and then re-exceeds the line A.

When planning construction of a wind power plant or individual generator, either at an initial consultation or pre-siting assessment phase, it is important to understand the energy production losses associated with various aspects of control of the wind power plant, and particularly in relation to the generators. Such understanding is also useful when identifying where energy production losses are made in existing plants and where a change in control method may be used to improve the energy production losses, without incurring high wear. The understanding of energy production losses even at an individual turbine level is important and can be performed prior to the construction of the generator or at any point during its lifetime to enable further refinement of its operation. Even after a turbine has decommissioned, it may still be useful to understand the energy losses.

During planning assessments or analysis of existing plants, data is typically available for use in predictions in the form of on-site free stream wind speed measurement data. On-site measurement data may be measured at the site. Where generators exist at the site already, data from the wind sensors on the generators may be collected by a SCADA or other monitoring system and modified to provide free-stream wind measurements using a nacelle transfer function. Alternatively, on-site data may be gathered using measurement masts, which may also be referred to as meteorological masts or MET masts, sited at the approximate location of the generators. The raw data may be utilised directly or may be modified to make it usable, typically based on long term meteorological data from the region.

Regardless of how it is measured, the data typically comprises relatively low-frequency data in the form of wind speeds averaged over fixed periods of time. This fixed period of time is conventionally 10 minutes, so that an average wind speed is provided over each consecutive 10 minute period.

As will be immediately apparent, these 10-minute average wind speeds are different to the exponential moving average wind speeds utilised by the turbine. This is an important distinction—the data available for predictions is wind speeds averaged without weighting over discrete, consecutive time periods, e.g. 0 seconds to 9 minutes 59 seconds, 10 minutes to 19 minutes 59 seconds, etc, whereas the control strategy of the wind turbine generator operates based on high-frequency wind speed data calculated by an exponential moving average that gives weights the average according to how recent the wind speed measurement was. Thus, any prediction or approximation to the losses from control at different wind speeds has to take into account the differences between the available on-site data and the wind turbine control data.

Other data available for use is data relating to the generators themselves, such as the rated power, power-wind speed profiles (power curves), data relating to control speeds such as the upper and lower threshold speeds, and data relating to the forces on generators at various wind speeds.

Figure 2:
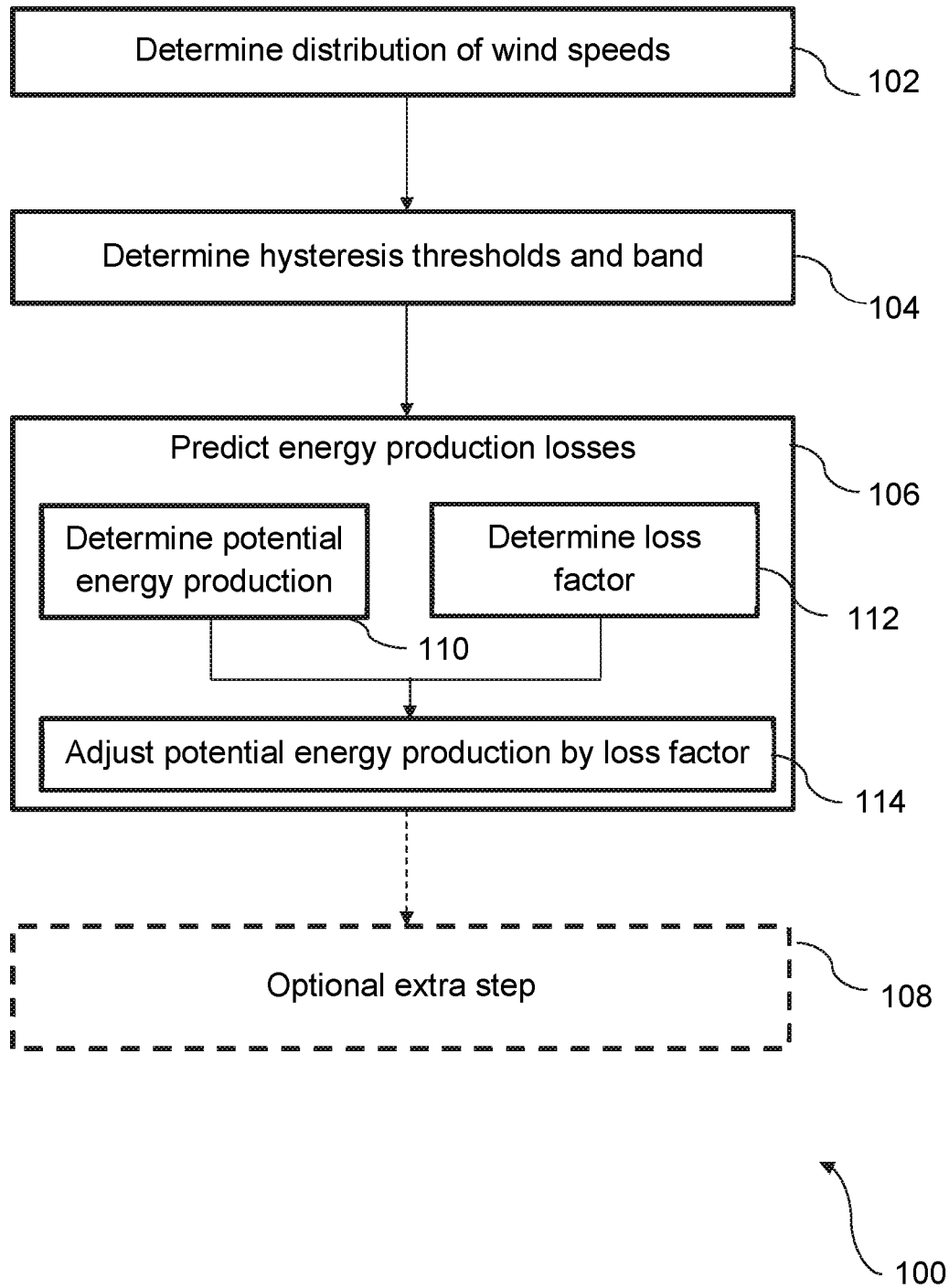
FIG. 2 shows a flow chart for a computer-implemented method of predicting energy production losses from a wind turbine generator, according to an embodiment of the invention.

In order to provide a prediction of energy production losses due to the high wind hysteresis control, a general, computer-implemented method 100 has been devised as depicted in the flow chart FIG. 2.

To summarise, the method 100 identifies that wind speeds fluctuate within the hysteresis band in a number of scenarios, and not all of these result in an energy production loss. However, using the limited information available relating to averaged wind speeds as described above along with generator characteristics, an energy production loss prediction can be made with a high level of accuracy by deriving a probability factor corresponding to the probability that wind speeds within the hysteresis band are wind speeds during high wind alarms where the generator has shut-off. Thus, by determining the total amount of energy present in the hysteresis band, which corresponds to the energy that may be lost if the generator was always shut-off when wind speeds were in the hysteresis band, and adjusting it based on the probability value, a prediction of hysteresis control energy production losses can be made.

Such a method makes use of the available data to provide an accurate determination of losses without requiring high amounts of computational power and high frequency data, and so can be performed quickly to allow rapid and accurate assessment of energy production. Existing methodologies utilise averaged wind speed data and make assumptions to create a simplified characterisation of the wind speed-hysteresis band interaction. Accordingly, the new method 100 improves upon the prior art and provides for a realistic prediction of the performance of a wind turbine generator under a particular control strategy, which is an important part of securing approval for wind power plants and the continued propagation of renewable energy.

Turning now to the steps of the computer-implemented method 100 in FIG. 2, the method begins at step 102 where a distribution of wind speeds for a site of a generator is determined. The distribution may be determined from measured data available from the SCADA system as noted above, and/or based on modelled or historical data.

Figure 3:
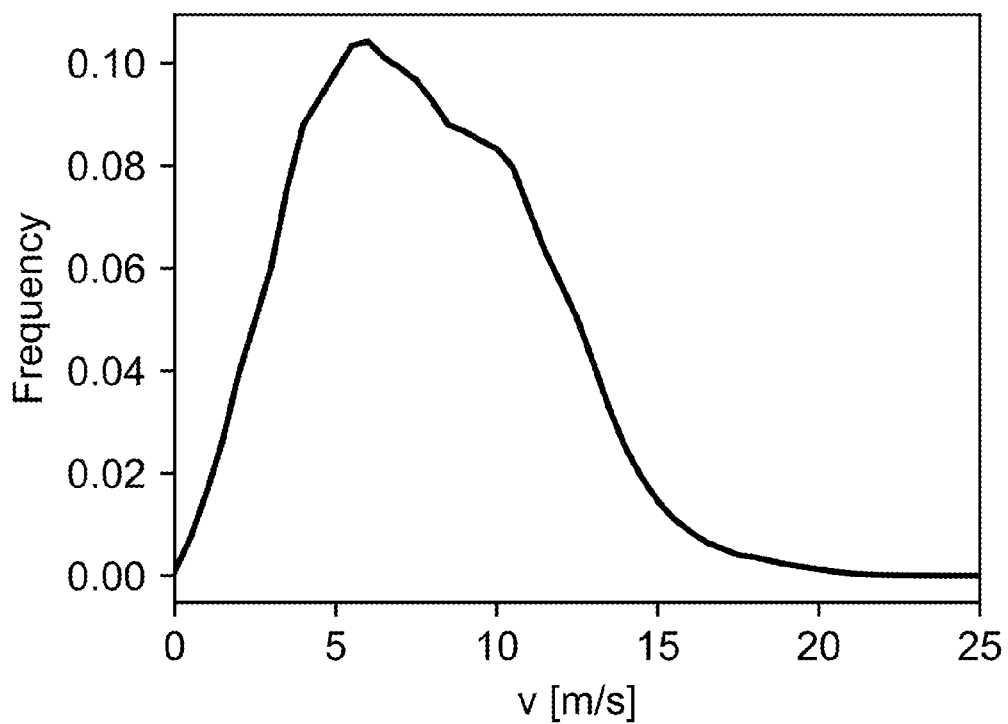
FIG. 3 shows an exemplary wind-speed frequency distribution for a wind power plant.

The distribution of wind speeds may comprise a quantification of a number of times a wind speeds occurs in the 10-minute average wind speed measurements, such as a count of the speeds or a frequency distribution of wind speeds. An example of a frequency distribution of wind speeds is determined, an example of which is shown in FIG. 3.

Returning to FIG. 2, at the next step 104, a hysteresis band for the generator is determined. As explained above, the hysteresis band is a range of wind speeds bounded by the upper and lower threshold wind speeds. The wind speeds of the hysteresis band may be continuous, binned wind speeds, or individually sampled discrete wind speeds.

At step 106, based on the distribution and the hysteresis band, energy production loss due to the high wind hysteresis control strategy are predicted. As shown in FIG. 2, the step 106 comprises three further steps. 110, 112, and 114.

Although energy production losses are described here, the method may also lend itself to determining power losses, by removing time data from the determination.

At step 110, a total energy value from wind speeds falling within the hysteresis band over a predetermined time period is determined based upon the distribution identified at step 102 and power data associated with the wind turbine generator. As will be appreciated, the total energy value corresponds to the energy comprised in the wind speeds falling within the hysteresis band by the generator. In other words, this value is the energy that would be produced by the generator if it were operated to extract energy from all the wind speeds falling within the whole range of the hysteresis band, or the energy that would be considered to be lost if the generator were to be shut down during all wind speeds falling within the hysteresis band.

The power data associated with the wind turbine generator may be derived in one or more ways. In some embodiments, the power data comprises the rated power of the wind turbine generator as it can be assumed that, at wind speeds close to the cut-off speed and within the hysteresis band, the power output of the wind turbine generator will be the rated power of the generator. Alternatively, in some embodiments, the power data associated with the wind turbine generator may be derived from a power-wind speed profile, known in the art as a power curve, of the wind turbine generator.

As will be demonstrated below in the example, the total energy value determined at step 110 may be determined by calculating an integral or an approximation to an integral. Where the power data comprises a power curve, the function used in the integral or approximation to it is a function of the distribution and the power. Where the power data comprises a rated power, the function may be a function of distribution, and the power part may be moved outside the integral because the rated power is assumed to have the same value across the whole hysteresis band.

Approximations to integrals include summations and other functions used for non-continuous distributions to allow the output of an integral to be approximated. Where a summation is used, the wind speeds may be binned according to the IEC standard for power performance measurement (61400-12-1:2017).

At step 112, a high wind factor for the energy value found at step 110 is determined. The high wind factor, which may also be referred to as a loss factor, is derived from and indicates a probability that a wind speed in the hysteresis band is during a high wind alarm. The probability is based on the distribution of 10-minute average wind speeds available for use in predictions from measurement systems. However, this is used as a proxy value to the probability of the exponential moving average wind speed being in the hysteresis band during the alarm. The method makes use of the available data, the 10-minute averaged wind speeds, to approximate the implementation of the control strategy based on exponential moving average wind speeds. As has already been explained, the prediction is concerned with losses within the hysteresis band. Wind speeds can either enter the hysteresis band by rising into it from below, i.e. by increasing from a wind speed lower than the lower threshold to exceed the lower threshold, or by dropping into it from above, i.e. by decreasing from a wind speed higher than the higher threshold to be less than the higher threshold. Only the wind speeds dropping into the hysteresis band from above are those where the generator has been shut-off, and so it is the probability that a wind speed enters the hysteresis band from above that matters in this step.

The high wind factor may be determined based on the distribution of the wind speeds, as will be demonstrated below.

At step 114, the total energy value for wind speeds within the hysteresis band, determined at step 110, is adjusted based on the high wind factor that was determined at step 112. Adjustment may comprise subtraction from, multiplication, or another function as appropriate, depending upon the form of the high wind factor.

An optional further step, step 108, is provided after step 106. Step 108 includes any further action taken using the energy production loss prediction.

In some embodiments of the optional extra step 108, the steps 102 to 106 may be repeated for each of a plurality of generators within a single plant to provide an overview of losses for a proposed wind power plant, and a comparison of the losses performed. In some embodiments, the steps 102 to 106 may be repeated for different variants of the generator, i.e. generators having different power ratings and/or power curves. In some embodiments, the steps 102 to 106 may be repeated for different threshold speeds and therefore different width hysteresis bands to identify a plurality of potential control strategies that can be compared to identify a strategy where the compromise between wear on the turbine and energy production losses is optimised. By optimising, the intention is to balance the wear and energy production losses for the generator as much as possible. A cost benefit analysis may be performed to identify the best control strategy/variant for the wind conditions.

In an example of an optional further step, the energy production losses predicted in the earlier steps may be used in an annual energy production determination. Methods for determining annual energy production are well known to the skilled person and will not be discussed further.

In some embodiments, the step 108 may include operating the wind turbine generator according to one of the determined hysteresis bands on the basis of the predicted energy production losses.

In other examples, step 108 may comprise the design of new parameters and/or adjustment of control strategies for the generators, and operating the generators accordingly. In some examples, individual generators of a plant may be assigned specific control strategies, thus permitting clear tailoring of the wind turbine generator control strategy to its location.

While discussed in relation to a single generator above, in embodiments the above method may be applied for a plurality of generators individually, or to a plant. For applying to a plant, an average wind speed distribution may be determined based on individual wind speed distributions for each generator within the plant, with the average distribution subsequently being used in the prediction along with a power curve for the plant. Alternatively, for applying to a plant, the losses for each generator may be determined individually and summed at a later stage to provide an overall loss. As will be appreciated, where the plant is a proposed plant, the distributions for generators will be based on measurement mast data corresponding to the location of the generator.

Figure 4:
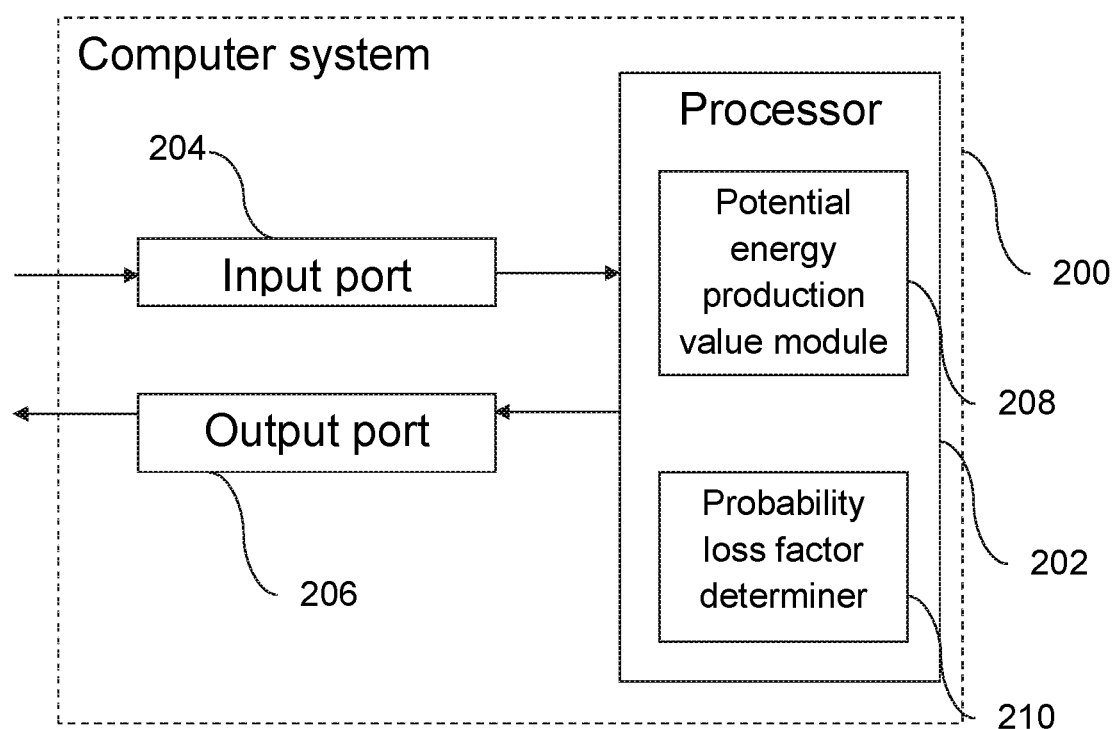
FIG. 4 shows a computer system according to an embodiment of the invention.

The above methodology is a computer-implemented method. Therefore, it may be implemented using a computer system, such as the computer system 200 shown in FIG. 4. The computer system 200 comprises a processor 202 configured to perform the method of FIG. 2, an input port 204 for receiving data, and an output port 206 for exporting results of the prediction to a display device or another system for use in an AEP determination. The processor 202 comprises a module for determining the potential energy production value 208 and a module for determining the loss factor 210. The computer system 200 may also include physical measuring apparatus connected to the input port for receiving measured data, as well as a data input device for receiving data from a user. The computer system 200 may have a data store for storing the data prior to and after making the prediction, and may have a connection to a communications network such as the internet. The computer system 200 may receive a readable storage medium comprising instructions that cause it to perform the above method.

In a specific embodiment, the prediction of energy production losses is achieved, for a continuous frequency distribution, by using a model of the energy production losses that includes the determinations listed in step 106. An embodiment of the model is given by the formula:

$$E_{loss}[f] = T \frac{f(v_{cut})}{f(v_{cut}) + f(v_{re})} \int_{v_{re}}^{v_{cut}} P(v)f(v)dv \quad (1)$$

where $v_{cut}$ and $v_{re}$ are the cut-off and cut-in wind speeds respectively, as noted above, T is a time period over which the losses are to be calculated, f(v) is the value of the continuous frequency distribution of the 10-minute average wind speed v, and P(v) is the power generated by the generator at wind speed v. T is envisaged to be 1 year, to permit the loss to be taken into account during annual energy production determinations, but may be any time period.

As can be identified in this equation, the total energy value, determined at step 110, is given by the section of the equation:

$$T \int_{v_{re}}^{v_{cut}} P(v)f(v)dv$$

The high wind factor is given as:

$$\frac{f(v_{cut})}{f(v_{cut}) + f(v_{re})}$$

For a binned distribution of frequencies, the model may be adapted to the following formula:

$$E_{loss}[f] = T \frac{f(v_{cut})}{f(v_{cut}) + f(v_{re})} \quad (2)$$

-continued
$$\left\{ 1/2[P(v_{re})f(v_{re}) + P(v_{cut})f(v_{cut})] + \sum_{v_{re} < v_i < v_{cut}} P(v_i)f(v_i) \right\}$$

In this case, the bins centered at $v_{re}$ and $v_{cut}$ contribute half their weight to the hysteresis band, hence the inclusion of the half clause within the potential energy yield, and f(v) is the binned wind frequency distribution.

The losses may also be determined based on non-frequency distributions, such as the distribution F(v) of the 10-minute average wind speeds over a year.

In the above equations (1) and (2), the power, generally P(v), may be substituted with the rated power so that the rated power is utilised instead of the power curve. This substitution may be performed as it may be assumed that the generator is operating at the rated power when wind speeds are high. For certain wind turbine generators that are specifically designed to operate in high wind speeds, it is preferable to utilise the power curve as the power output of such generators may be less than rated at higher speeds.

In each of the above, it can be seen that the energy production losses are modelled based on a likelihood of a wind speed in the hysteresis band has entered the band from above the band, and a combination of this with the total amount of obtainable wind energy within the hysteresis band. The likelihood is provided by a ratio of the distribution of winds at the cut-out windspeed, indicated by $F(v_{cut})$ or $f(v_{cut})$ to the total amount of wind just above and below the hysteresis band, given by the sum of $F(v_{cut})$ or $f(v_{cut})$ with $F(v_{re})$ or $f(v_{re})$ respectively.

These specific models therefore make use of the distributions in two ways: in a first way within the ratio to determine an indicator for the probability of the wind speed taking place during a high wind alarm, and therefore constituting an energy production loss; and in a second way within the determination of potential energy production within the hysteresis band. The equations can therefore be considered to be of second order in the wind distribution. This is important, because the energy production losses are product of both the amount of wind speeds falling within the hysteresis band, and the probability of the generator being shut down due to high wind alarms. This probability is dependent on the shape of the wind speed and utilising a second order model permits an accurate determination of this.

These models are derivable from general principles. The derivation below assumes that the wind turbine generators determine high wind alarms and apply high wind hysteresis control when an exponential moving average (EMA) wind speed, $v_{EMA}$, reaches the cut-off speed $v_{cut}$. The sample rate of the EMA is $\Delta t$, such that each value of the EMA wind speed can be considered to occupy a width of $\Delta t$. A distribution of wind speeds generated using the EMA wind speeds over a time period T is referred to as $G(v_{EMA})$. Because the control structure is based on the EMA wind speeds, only time steps where $v_{EMA} > v_{re}$ can be in alarm. The specified power of the generator is taken to be the rated power, $P_{rated}$, in the hysteresis band. Therefore, the loss due to high wind hysteresis is given by the formula:

$$E_{loss}[G] = \Sigma_{v_{re} < v_{EMA,i} < v_{cut}} G(v_{EMA,i}) \cdot P_{rated} \cdot \Delta t \cdot p_A(v_{EMA,i}) \quad (3)$$

where $p_A(v_{EMA,i})$ is the probability that a time step with EMA wind speed $v_{EMA,i}$ is taking place when there is a high wind alarm, i.e. the wind turbine is shut-off. The sum is over all time steps with the EMA wind speed in the hysteresis band. As can be seen, this prediction of energy production losses relies on the adjustment by a probability-based loss factor of a value of the energy production in the entire hysteresis band, as described in the method of FIG. 2.

As EMA wind distributions, the probability, and the sample rate are not quantities that are readily available prior to performing most energy production predictions, these values need to be converted to use readily available values.

To do so, the average probability of the probability value in the hysteresis band, $p_A(v_{EMA,i})$ in formula (3), is calculated. Calculating the average probability allows for approximation to the probability based on known values.

As the value of $v_{EMA}(t)$ changes slowly, it can be considered to be a continuous function of time. If $v_{EMA}(t)$ is in the hysteresis band, then it corresponds to an alarm if and only if the function crossed into the hysteresis band from above $v_{cut}$.

As discussed above, only the parts of the time series with $v_{re} < v_{EMA(t)} < v_{cut}$ have the potential to contribute to the losses from hysteresis. Accordingly, the time series can be separated into snippets that start when one of the cut-in or cut-off speeds is reached and the wind speed time series enters the hysteresis band and enter when the time series leaves the band again. In terms of FIG. 1, this corresponds to starting a snippet when the A line is crossed from above, or the B line is crossed from below and ending the snippet when one of the lines is crossed from inside the hysteresis band.

There are four possible combinations of crossings, which will be called scenarios hereafter, to consider in relation to how these snippets of the wind speed time series interact with the hysteresis band. An example of each scenario is shown in the time series of FIG. 5. The scenarios are:
1. B-B, in which the wind speed rises from below the cut-in speed to enter the band but also exits by re-crossing the cut-in speed;
2. B-A, in which the wind speed rises from below and exits by exceeding the cut-off speed;
3. A-A, in which the wind speed has previously exceed the cut-off speed, and descends into the hysteresis band before rising above the cut-off speed again; and
4. A-B, in which the wind speed has previously exceeded the cut-off speed, and descends out of the band below the cut-in speed.

Figure 5:
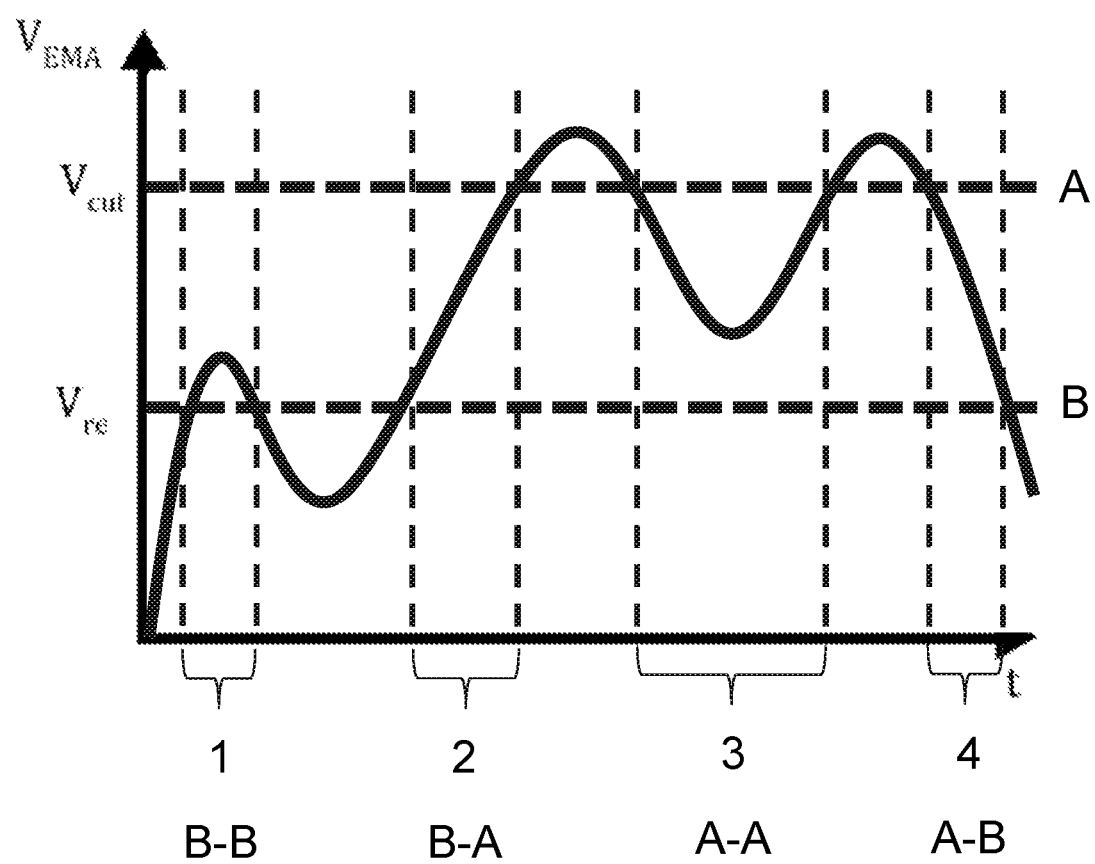
FIG. 5 shows another exemplary wind speed time series.

In FIG. 5, each scenario is labelled with the numbering above.

These scenarios can be represented generally as $S_{entry\text{-}exit}$ so that $S_{B\text{-}B}$ represents the first scenario. $S_{B\text{-}A}$ represents the second, and so on.

The time spent in hysteresis is given by the sum of the length |S| of all snippets that enter from above the hysteresis band, so the average probability that a wind speed in the hysteresis band contributes to hysteresis loss is given by the formula:

$$\overline{p_A} = \frac{\sum_{S_i \in S_{A-A} \cup S_{A-B}} \|S_i\|}{\sum_k \|S_i\|}$$

In other words, the probability of a wind speed snippet in the hysteresis band being during a high wind alarm or shut-off, and thereby causing energy losses, is the ratio of the sum of the lengths of all snippets entering the hysteresis band by crossing the A line and exiting the hysteresis band by crossing either the A or B line to the sum of the length of all snippets in the hysteresis band. This follows, as any snippet entering from above has already exceeded the cut-off speed, and so has caused a shut-off of the generator.

As this probability estimation remains difficult to derive based on available parameters, a further assumption is needed. It is assumed that the average length of all snippets that entered from above is the same as the average length of snippets that entered from below. This can be represented as:

$$\overline{\|S_{A-A} \cup S_{A-B}\|} \equiv \frac{\sum_{S_i \in S_{A-A} \cup S_{A-B}} \|S_i\|}{N_a} \approx \frac{\sum_{S_i \in S_{B-B} \cup S_{B-A}} \|S_i\|}{N_b} \equiv \overline{\|S_{B-B} \cup S_{B-A}\|}$$

Where:

$$N_k = \sum_{S_i \in S_{k-A} \cup S_{k-B}} 1$$

is the number of snippets that started above the hysteresis band, where (k=a), or below the hysteresis band, where (k=b). This is a reasonable assumption because hysteresis bands are typically relatively narrow compared to the range of possible wind speeds. Therefore, the transition rate between wind speeds is close to uniform across the band, and the averages are over snippets with mirrored symmetry: $S_{A\text{-}B}$ corresponds to $S_{B\text{-}A}$ and $S_{A\text{-}A}$ corresponds to $S_{B\text{-}B}$.

Based on this assumption, the probability can be simplified to:

$$\overline{p_A} = \frac{N_a}{N_a + N_b}$$

so that the average probability of an EMA wind speed in the hysteresis band being during a high wind alarm is given by the ratio of the snippets starting above the hysteresis band to the total number of snippets entering the hysteresis band.

This is relatable to the wind distribution of 10-minute averages F(v). The transition rate for the windspeed going up at $v_{re}$ and down at $v_{cut}$ are similar, so it can be assume that the number of snippets starting above the hysteresis band, $N_a$, is proportional to the amount of wind at the upper threshold wind speed in the wind distribution of 10-minute averages $F(v_{cut})$. Likewise, the number of snippets starting below the hysteresis band, $N_b$, is proportional to the weight at the lower threshold wind speed with the same proportionality. Then $$\overline{p_A} = \frac{F(v_{cut})}{F(v_{cut}) + F(v_{re})}$$

The probability is now derivable from an accessible data set, the distribution of 10-minute averages F(v), and this can also be converted to be used with frequency distributions of the 10-minute average wind speeds f(v) as:

$$\overline{p_A} = \frac{f(v_{cut})}{f(v_{cut}) + f(v_{re})}$$

In other embodiments, the denominator in the above ratio may be assigned weight so that the $f(v_{cut})$ and $f(v_{re})$ values are weighted relative to one another, rather than being given equal weight. These weights may be determined based on modelled data and/or the frequency data.

Returning to equation (3), the sum term:

$$\Sigma_{v_{re}<v_{EMA,i}<v_{cut}} G(v_{EMA,i})$$

is the amount of time stamps the EMA wind speed is in the hysteresis band. Since the time constant of the EMA is 10 minutes, it can be approximated by the same sum for the distribution of 10-minute averages multiplied by the number of timestamps per frame, so that:

$$\sum_{v_{re}<v_{EMA,i}<v_{cut}} G(v_{EMA,i}) \approx \frac{10 \text{ min}}{\Delta t} \sum_{v_{re}<v_i<v_{cut}} F(v_i) \quad (3)$$

Combining these estimates, produces the model:

$$E_{loss}[f] = P_{rated} 10 \text{ minutes} \frac{F(v_{cut})}{F(v_{cut}) + F(v_{re})} \sum_{v_{re}<V_I<v_{cut}} F(v_l) \quad (4)$$

which can be adjusted to give either of the formulas (1) and (2) above.

In order to demonstrate the effectiveness of the model described above, it has been compared with existing data gathered from an existing wind plant and a conventional model.

The existing model, which is described in Part 6 of the "Technical Guidelines for Wind Energy" produced by the Fördergesellschaft Windenergie und andere Dezentrale Energien (FGW e.V), uses an assumption that splitting the hysteresis band in half and determining the amount of energy production in the upper half of the hysteresis band only gives a good approximation to the energy losses due to high wind hysteresis. In general, this can be considered to be a first order model only, because it relies only upon the weight of wind speeds in part of the hysteresis band, and does not take into account the shape of the time series and thus the wind speed interaction with the hysteresis band.

Figure 6:
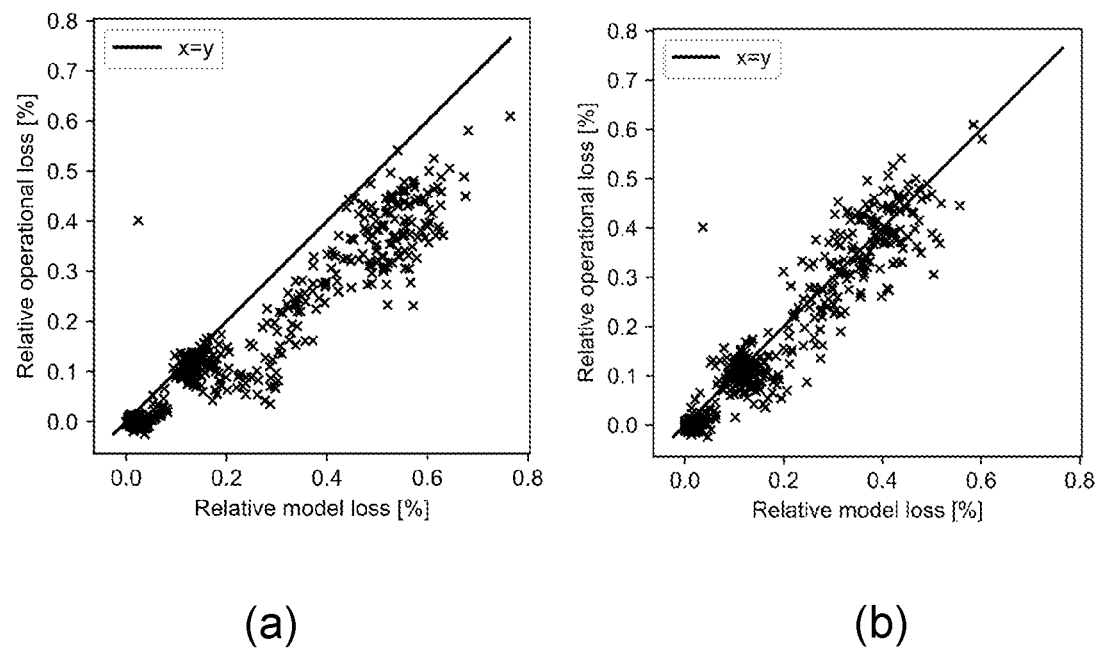
FIGS. 6(a) and (b) show a comparison of actual data for energy production loss due to high wind hysteresis control with (a) a conventional model and (b) a model according to an embodiment of the invention.

Using data from an existing wind park, the models were compared and were compared with data gathered directly from the park relating to losses. FIGS. 6(a) and 6(b) illustrate respective comparisons of the results of the conventional model and the new model described herein with the determination of actual losses. The X axis represents the relative operational loss predicted by the relevant model, while the Y axis represents the relative operational loss of the actual data. An x=y line is also depicted in each Figure. Points above the line represent underestimation of the loss by the model and points below the line represent overestimation by the model. As can be seen, the conventional model shown in FIG. 6(a) consistently overestimates the loss, while the present model in FIG. 6(b) provides a much closer alignment with the actual results.

The above method concentrates on losses due to hysteresis control. It will be appreciated that it is possible for the energy production within the hysteresis band that is not 'lost' to also be predicted.

Furthermore, the method may also be adapted to take account of gains due to the hysteresis control. The gains may be identified, e.g., based on the delay between the exponential moving average and the instantaneous wind speed. Additional losses may also be identified based on this delay. These gains and losses may be taken into account at step 114 of predicting the losses.

It will be appreciated that various changes and modifications can be made to the present invention without departing from the scope of the present application.

The invention claimed is:

1. A computer-implemented method for predicting energy production losses associated with high wind hysteresis control of a wind turbine generator, the high wind hysteresis control comprising, when a wind speed exceeds an upper hysteresis threshold value, shutting off the wind turbine generator until the wind speed reaches a lower hysteresis threshold value, the method comprising:
   (a) determining a distribution of wind speeds for a site of the wind turbine generator;
   (b) determining a high wind hysteresis band for the wind turbine generator that comprises a range of wind speed values between the upper hysteresis threshold value and the lower hysteresis threshold value; and
   (c) predicting energy production loss due to the high wind hysteresis control, wherein the prediction includes:
      (c-1) determining a high wind factor corresponding to a probability that the wind speeds in the hysteresis band occur during a period when the wind turbine generator is shut off by the high wind hysteresis control, wherein determining the high wind factor comprises:
         determining a ratio corresponding to a number of wind speeds entering the hysteresis band from above the upper hysteresis threshold value to a total number of wind speeds entering the hysteresis band from above the upper hysteresis threshold value and below the lower hysteresis threshold value;
      (c-2) determining, based on the distribution of wind speeds and power data associated with the wind turbine generator, an energy value associated with the wind speeds falling within the hysteresis band over a predetermined time period; and
      (c-3) determining the energy production loss by applying the high wind factor to the determined energy value.

2. The computer-implemented method of claim 1, wherein the power data associated with the wind turbine generator is derived from a wind speed-power profile for the wind turbine generator.

3. The computer-implemented method of claim 1, wherein the power data associated with the wind turbine generator comprises a rated power of the wind turbine generator.

4. The computer-implemented method of claim 1, wherein the distribution of wind speeds comprises a wind speed-frequency distribution.

5. The computer-implemented method of claim 1, wherein determining the energy value comprises determining an integral of or an approximation to the integral of a function of the distribution of wind speeds between bounds of the hysteresis band.

6. The computer-implemented method of claim 5, wherein the energy value is determined using a formula:

$$T \int_{v_{re}}^{v_{cut}} P(v) f(v) dv$$

where T is a predetermined period of time over which the energy production loss is to be calculated, $v_{cut}$ is an upper hysteresis threshold wind speed value, $v_{re}$ is a lower hysteresis threshold wind speed value, P(v) is a power value at wind speed v, and f(v) is a frequency of the wind speed v in a frequency distribution.

7. The computer-implemented method of claim 1, wherein the high wind factor is determined based on the distribution of wind speeds.

8. The computer-implemented method of claim 1, wherein applying the high wind factor to the energy value comprises multiplying the energy value by the ratio corresponding to the number of wind speeds entering the hysteresis band from above the upper hysteresis threshold value to the total number of wind speeds entering the hysteresis band from above the upper hysteresis threshold value and below the lower hysteresis threshold value.

9. The computer-implemented method of claim 8, wherein the high wind factor is determined using a formula:

$$\frac{f(v_{cut})}{f(v_{cut}) + f(v_{re})}$$

wherein $f(v_{cut})$ and $f(v_{re})$ are frequencies of the upper hysteresis threshold and lower hysteresis threshold wind speed values respectively in a frequency distribution of wind speeds.

10. The computer-implemented method of claim 1, comprising:
  performing the steps of the method for a plurality of different hysteresis bands; and
  selecting one of the plurality of hysteresis bands for implementing high wind hysteresis control at the wind turbine generator.

11. The computer-implemented method of claim 10, comprising determining operational forces and wear associated with each of the plurality of different hysteresis bands, and wherein the selecting of one of the plurality of hysteresis bands is performed based on an analysis comparing the energy production losses and the operational forces and wear associated with each hysteresis band.

12. The computer-implemented method of claim 1, comprising determining annual energy production of the wind turbine generator, the annual energy production comprising the predicted energy production loss.

13. The computer-implemented method of claim 1, wherein predicting energy production loss due to the high wind hysteresis control comprises determining an energy gain value associated with the high wind hysteresis control, and determining the energy production loss by applying the energy gain value and the high wind factor to the energy production loss.

14. A computer-readable storage medium comprising instructions which, when executed by a computer, cause the computer to perform an operation for predicting energy production losses associated with high wind hysteresis control of a wind turbine generator, the high wind hysteresis control comprising, when a wind speed exceeds an upper hysteresis threshold value, shutting off the wind turbine generator until the wind speed reaches a lower hysteresis threshold value, the operation comprising:
  (a) determining a distribution of wind speeds for a site of the wind turbine generator;
  (b) determining a high wind hysteresis band for the wind turbine generator that comprises a range of wind speed values between the upper hysteresis threshold value and the lower hysteresis threshold value; and
  (c) predicting energy production loss due to the high wind hysteresis control, wherein the prediction includes:
    (c-1) determining a high wind factor corresponding to a probability that the wind speeds in the hysteresis band occur during a period when the wind turbine generator is shut off by the high wind hysteresis control, wherein determining the high wind factor comprises:
      determining a ratio corresponding to a number of wind speeds entering the hysteresis band from above the upper hysteresis threshold value to a total number of wind speeds entering the hysteresis band from above the upper hysteresis threshold value and below the lower hysteresis threshold value;
    (c-2) determining, based on the distribution of wind speeds and power data associated with the wind turbine generator, an energy value associated with the wind speeds falling within the hysteresis band over a predetermined time period; and
    (c-3) determining the energy production loss by applying the high wind factor to the energy value.

15. The computer-readable storage medium of claim 14, wherein the power data associated with the wind turbine generator is derived from a wind speed-power profile for the wind turbine generator.

16. The computer-readable storage medium of claim 14, wherein the power data associated with the wind turbine generator comprises a rated power of the wind turbine generator.

17. The computer-readable storage medium of claim 16, wherein the distribution of wind speeds comprises a wind speed-frequency distribution.

18. A system, comprising:
  a memory containing instructions; and
  one or more processors which, when programmed with the instructions, are configured to perform an operation for predicting energy production losses associated with high wind hysteresis control of a wind turbine generator, the high wind hysteresis control comprising, when a wind speed exceeds an upper hysteresis threshold value, shutting off the wind turbine generator until the wind speed reaches a lower hysteresis threshold value, the operation comprising:
  (a) determining a distribution of wind speeds for a site of the wind turbine generator;
  (b) determining a high wind hysteresis band for the wind turbine generator that comprises a range of wind speed values between the upper hysteresis threshold value and the lower hysteresis threshold value; and
  (c) predicting energy production loss due to the high wind hysteresis control, wherein the prediction includes:
    (c-1) determining a high wind factor corresponding to a probability that the wind speeds in the hysteresis band occur during a period when the wind turbine generator is shut off by the high wind hysteresis control, wherein determining the high wind factor comprises:
      determining a ratio corresponding to a number of wind speeds entering the hysteresis band from above the upper hysteresis threshold value to a total number of wind speeds entering the hysteresis band from above the upper hysteresis threshold value and below the lower hysteresis threshold value;
    (c-2) determining, based on the distribution of wind speeds and power data associated with the wind turbine generator, an energy value associated with the wind speeds falling within the hysteresis band over a predetermined time period; and (c-3) determining the energy production loss by applying the high wind factor to the energy value.

* * * * *